Dec. 16, 1952　　M. E. McCLELLAN ET AL　　2,621,588
TYING MECHANISM FOR BALERS
Filed Aug. 6, 1949　　9 Sheets-Sheet 1

INVENTORS
M.E. McCLELLAN,
L.G. CHEATUM & G.B. HILL
BY
R C Johnson
ATTORNEYS

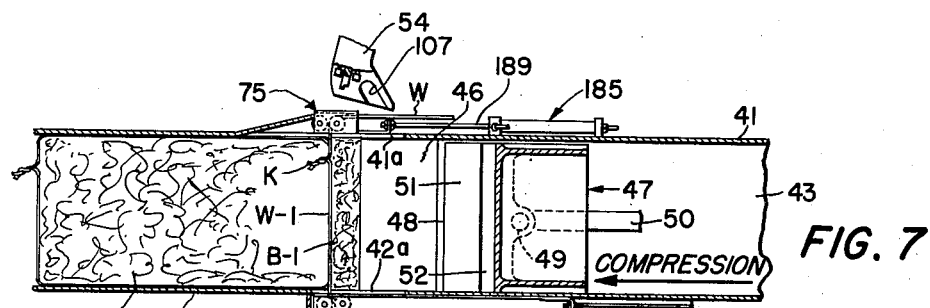
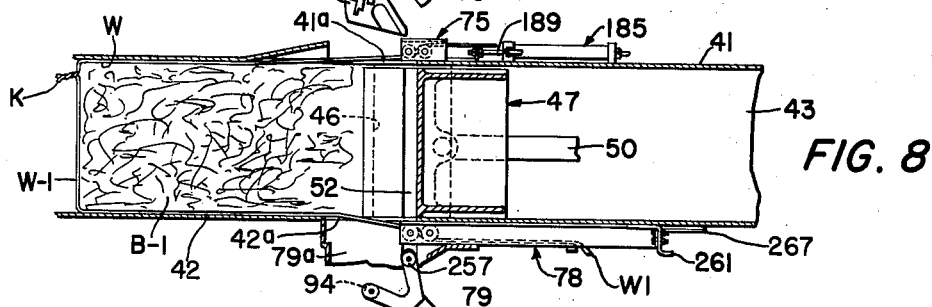
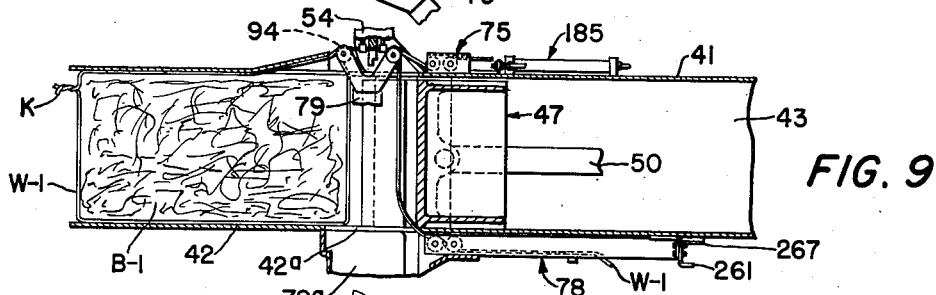
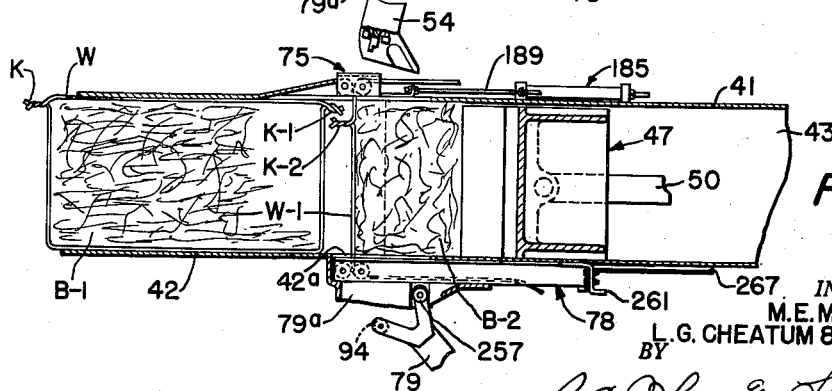

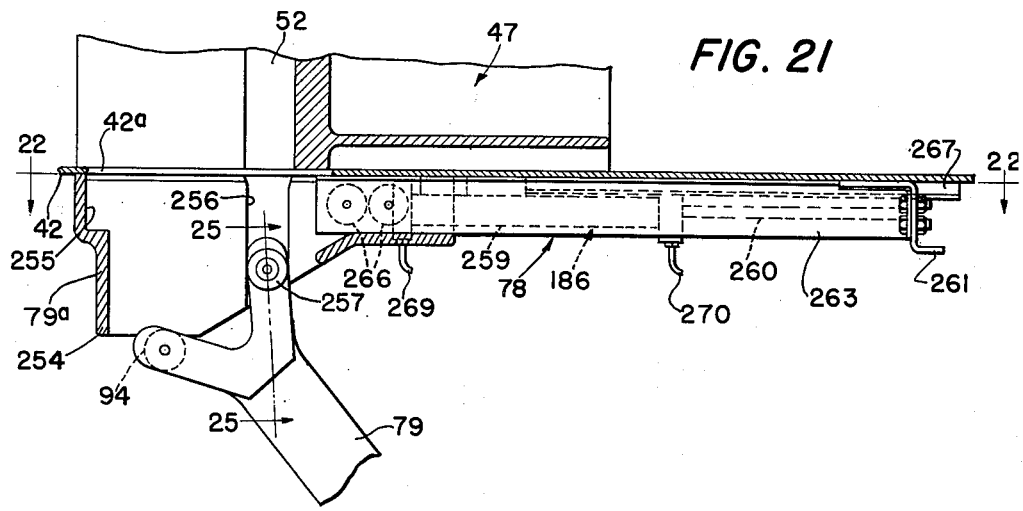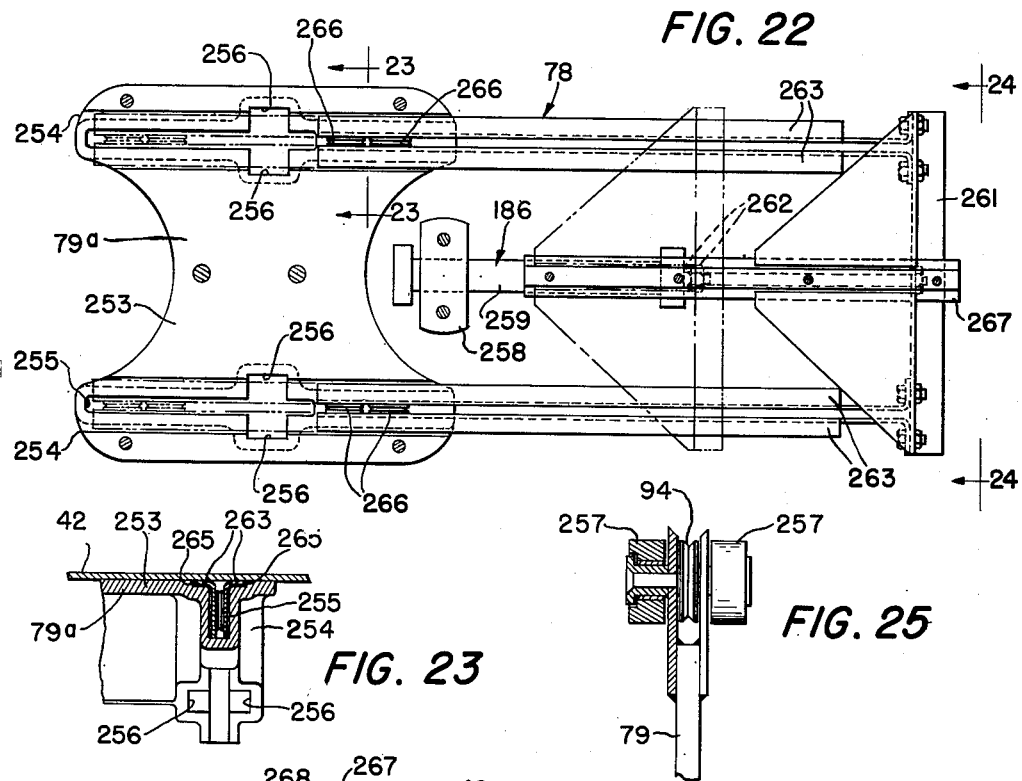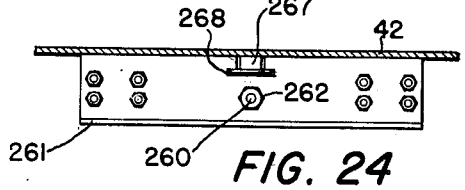

Dec. 16, 1952   M. E. McCLELLAN ET AL   2,621,588
TYING MECHANISM FOR BALERS
Filed Aug. 6, 1949   9 Sheets-Sheet 8
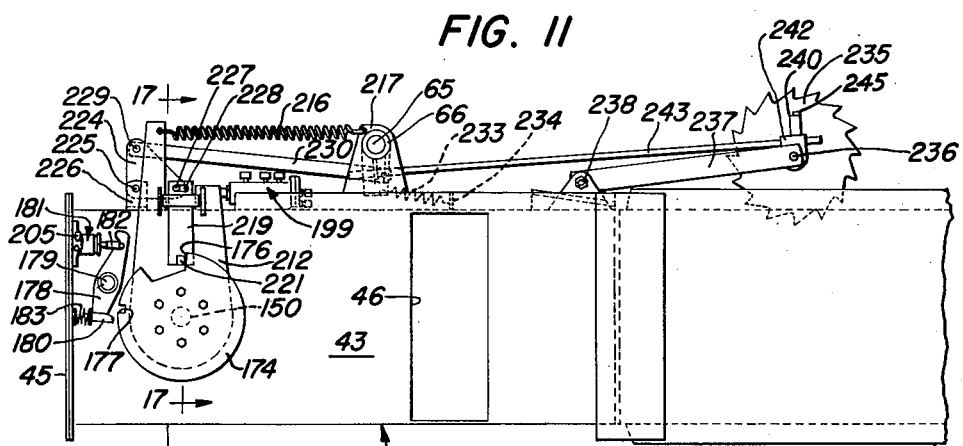
FIG. 11
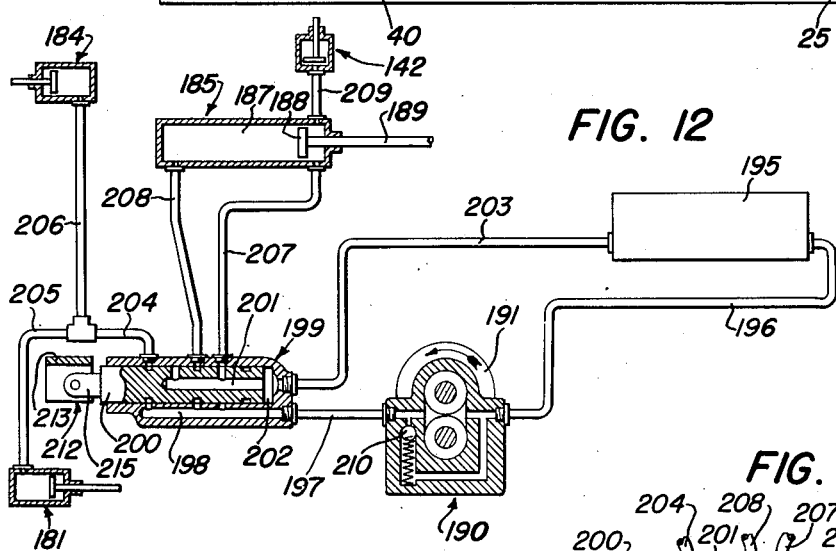
FIG. 12
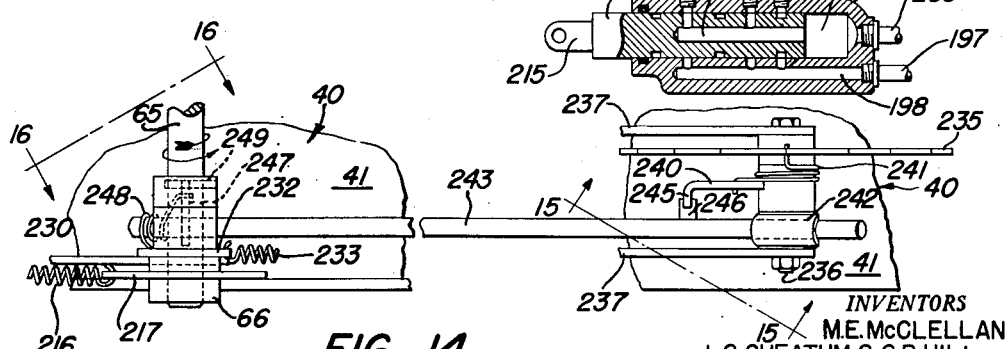
FIG. 13
FIG. 14
INVENTORS
M.E. McCLELLAN,
L.G. CHEATUM & G.B. HILL
BY
ATTORNEYS

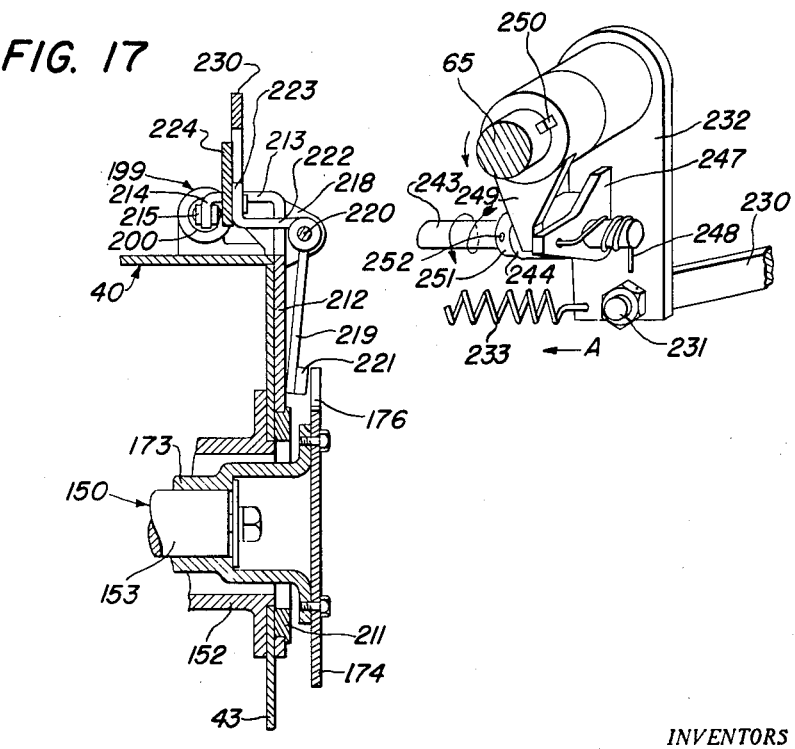

Patented Dec. 16, 1952

2,621,588

UNITED STATES PATENT OFFICE 2,621,588

TYING MECHANISM FOR BALERS

Marcus E. McClellan and Leo G. Cheatum, Ottumwa, Iowa, and George B. Hill, New Holland, Pa., assignors to Deere Manufacturing Co., Dubuque, Iowa, a corporation of Iowa Application August 6, 1949, Serial No. 109,028

9 Claims. (Cl. 100—11)

1

This invention relates to an automatic baler or like machine. More particularly, the invention relates to improved means for coordinating the various functions of the baler so as to obtain the most desirable operational effects of the various baling components, especially the bale-forming means and the bale-tying means.

Although the principles of the invention, as will be subsequently brought out herein, are applicable to balers of all types, the preferred embodiment of the invention on which the present disclosure is based is intended primarily for use in an agricultural baler of the type utilized to pick up hay, straw or other cut crop material, and to feed such material to means by which bales are formed and subsequently tied and then ejected. In the usual type of machine for this purpose, the baler is mobile and is propelled by a tractor or other suitable source of draft power. The operating parts of the baler may derive power from a power source in the form of an internal combustion engine carried directly by the baler or from a power source deriving power in the first instance from the power take-off shaft of the propelling tractor.

One of the principal objects of the present invention is to provide improved tying mechanism which is normally disposed in a position relatively remote from the bale case while the bale is being formed and which is shiftable to a position relatively close to the bale case after the bale is formed, so that the tying medium may be wrapped around the bale and tied without unnecessary and undesirable slack. A further important object related to the foregoing object is the provision of means for guiding the tying medium, which may be either wire or twine, during functioning of the baler while the tying mechanism is in its relatively remote position. A still further object is to provide operating means for the tying mechanism which renders the tying mechanism idle during formation of the bale, and to include driving mechanism which sequentially places the tying mechanism in tying position and effects mobilization of the tying mechanism drive means.

Further objects are to provide: Improved means for guiding a needle or other strand-carrying means across the bale case and at one end of the bale; improved means for guiding the needle, preferably through tracks or guides in the plunger; means for holding the plunger on its compression stroke so that the needle may pass through the guides or tracks; and means for holding the wire or twine always in readiness to be tied, so that in the event of failure of the tying mechanism to function, it will not be necessary to re-thread the needle.

The foregoing and other important objects inherent in and encompassed by the invention will become apparent to those skilled in the art as the following detailed description and accompanying sheets of drawings disclose a preferred embodiment of the invention.

In the drawings:

Figures 7-10 are diagrammatic illustrations showing successive stages in the forming and tying of a bale;

Figure 11 is a front elevational view of the baling mechanism separated from the material-feeding means, as viewed substantially along the line 11—11 of Figure 1, several extraneous components having been omitted from the figure for the purposes of clarification;

Figure 12 is a schematic view showing the arrangement of the control means as embodied in a fluid-pressure control system;

Figure 13 is a sectional view, on an enlarged scale, of the control valve illustrated in Figure 12, Figure 13 illustrating the movable valve member in a different position;

Figure 14 is a fragmentary plan elevational view of part of the mechanism that initiates actuation of the control means;

Figure 15 is a perspective view of part of the mechanism shown in Figure 14, as viewed in the direction of the arrows on the line 15—15 of Figure 14;

Figure 16 is a perspective view of another portion of the mechanism shown in Figure 14, the view being taken in the direction of the arrows on the line 16—16 of Figure 14;

Figure 17 is an enlarged fragmentary sectional view taken substantially on the line 16—16 of Figure 11 and illustrating part of the motion-transmitting means between the drive means for the bale-forming means and the control means;

Figure 18 is an enlarged fragmentary sectional view taken substantially on the line 18—18 of Figure 3 and illustrating the connectible and disconnectible driving means for the tying means;

Figure 19 is an enlarged fragmentary sectional view of a portion of the tying mechanism as viewed along the line 19—19 of Figure 3;

Figure 20 is a top plan view of the plungerhead;

Figure 21 is an enlarged fragmentary sectional view of a lower portion of the bale case, showing the needle guide means, the needle, and a portion of the plunger, together with the wire-carrying means;

Figure 22 is a plan sectional view taken substantially along the line 22—22 of Figure 21;

Figure 23 is a fragmentary transverse sectional view taken on the line 23—23 of Figure 22;

Figure 24 is an end elevational view, partly in section, as viewed along the line 24—24 of Figure 22; and Figure 25 is an enlarged fragmentary sectional view taken substantially along the line 25—25 of Figure 21.

For the purposes of clarification of various details of the invention and the relation of these details to the particular baler chosen for purposes of illustration, the following description will proceed more or less on a basis of describing the various components as units with respect to their functional characteristics.

Figure 1:
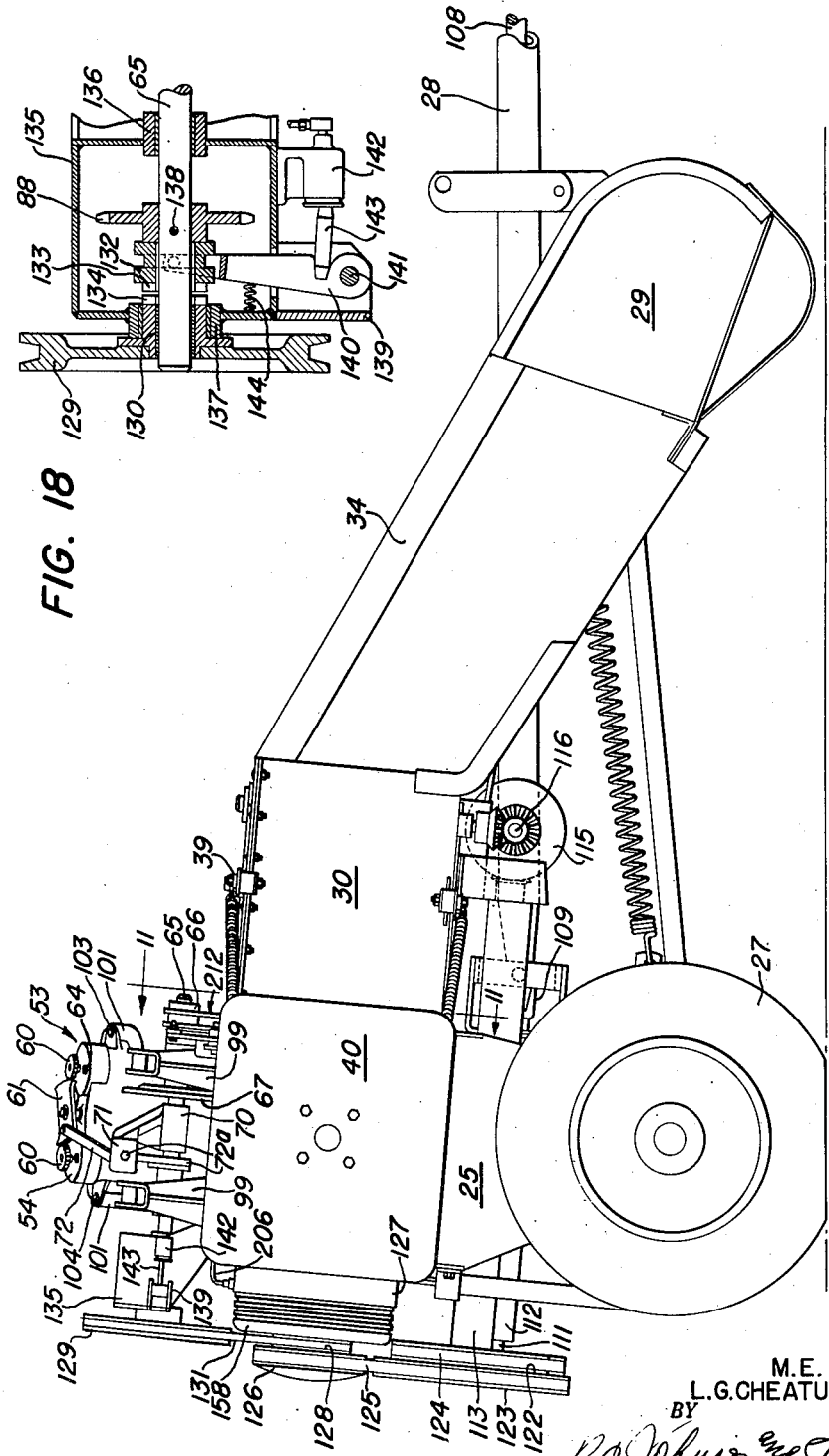
Figure 1 is a side elevational view of a pick-up baler.
Figure 2:
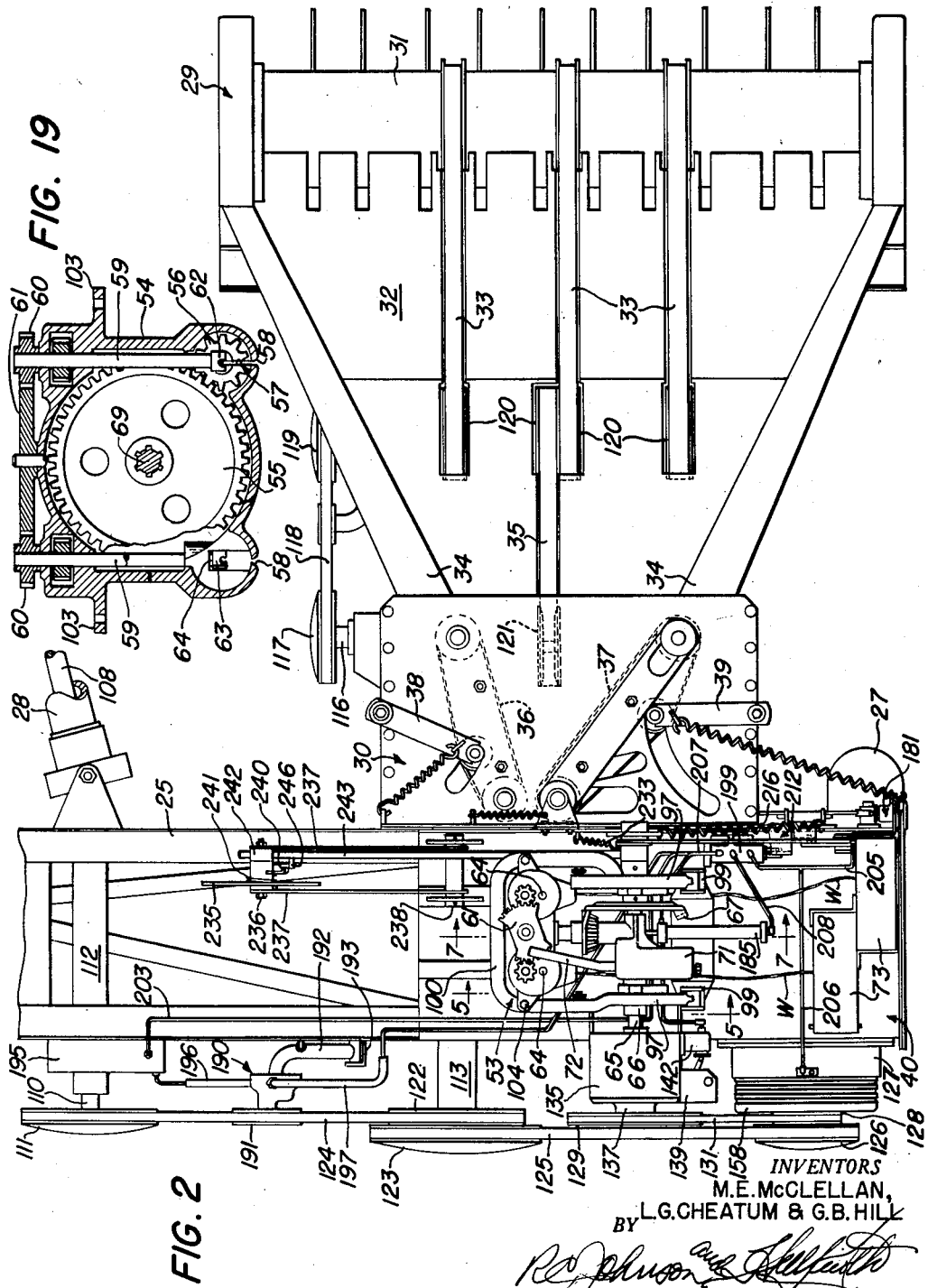
Figure 2 is a plan view of the pick-up baler.
Figure 3:
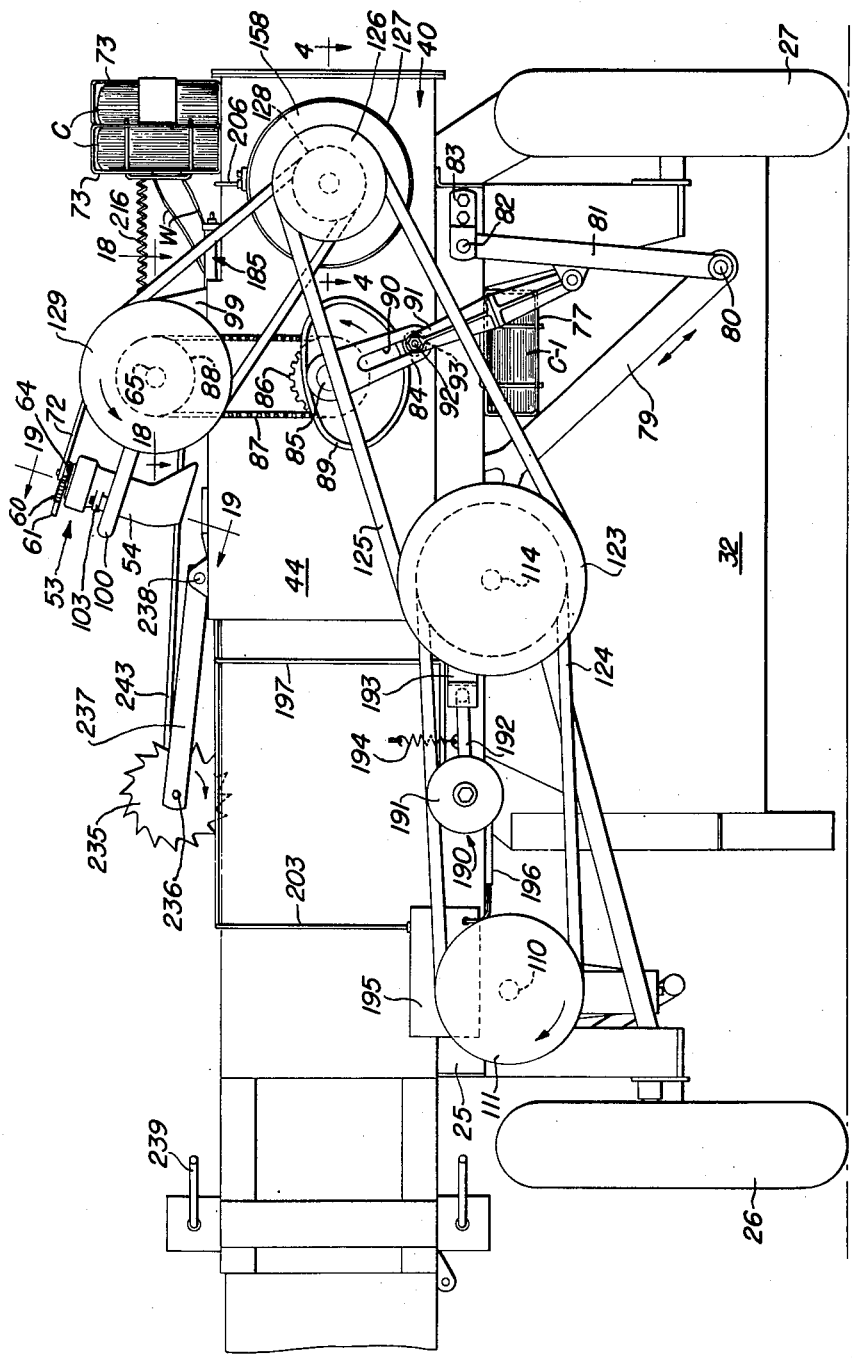
Figure 3 is a rear elevational view of the pick-up baler.

*General baler construction—Figures 1, 2 and 3*

(Reference numerals 25–40)

The mobile baler illustrated herein comprises supporting structure including a transverse main frame 25 carried on transversely spaced apart wheels 26 and 27. The main frame has connected thereto a forwardly extending draft member 28 which may be suitably connected at its forward end to a tractor or other source of draft power.

The supporting structure also includes at the right-hand side of the baler means for handling material such as hay or straw picked up from the ground, this means including a pick-up unit 29 and a material-feeding unit 30.

Reference herein to right- and left-hand sides of the machine is to be considered with respect to the position of an observer standing behind the machine and looking forwardly.

The pick-up unit 29 may be of any suitable construction and is here shown as including a pick-up cylinder 31 which picks up material from the ground and transfers such material to a rearwardly and upwardly inclined platform 32. Endless belt conveyors 33 are provided for facilitating movement of the material rearwardly toward the feeding unit 30. The rear portion of the platform 32 narrows because of rearwardly converging side walls 34 so that the forward portion of the feeding unit 30 has a throat considerably narrower than the transverse width of the pickup cylinder 31. Another endless belt 35 assists in moving of the material into the feeding unit 30. This unit may be of any suitable construction, that shown including means for preliminarily compacting or compressing the material, and for this purpose there are indicated in Figure 2, in dotted lines, a left-hand feeder belt 36 and a right-hand feeder belt 37. These belts are respectively carried on rollers mounted on vertical axes and including spring-loaded belt-tensioning devices 38 and 39 respectively. Since the feeding mechanism illustrated may be of any suitable construction, and since it forms no part of the present invention, further detailed description thereof will not be made. Suffice it to say that the feeding mechanism, like the pick-up unit, is merely representative of appropriate means for effecting the feeding of material to bale-forming means to be described below.

The general baler construction includes part of the bale-forming means which comprises a bale case which is designated generally by the numeral 40 and which will be referred to briefly at this point for the purpose of completing the description of the manner in which the material is picked up from the ground and fed to the baleforming means.

*Bale-forming means—Figures 7–11 and 20*

(Reference numerals 40–52)

Figure 4:
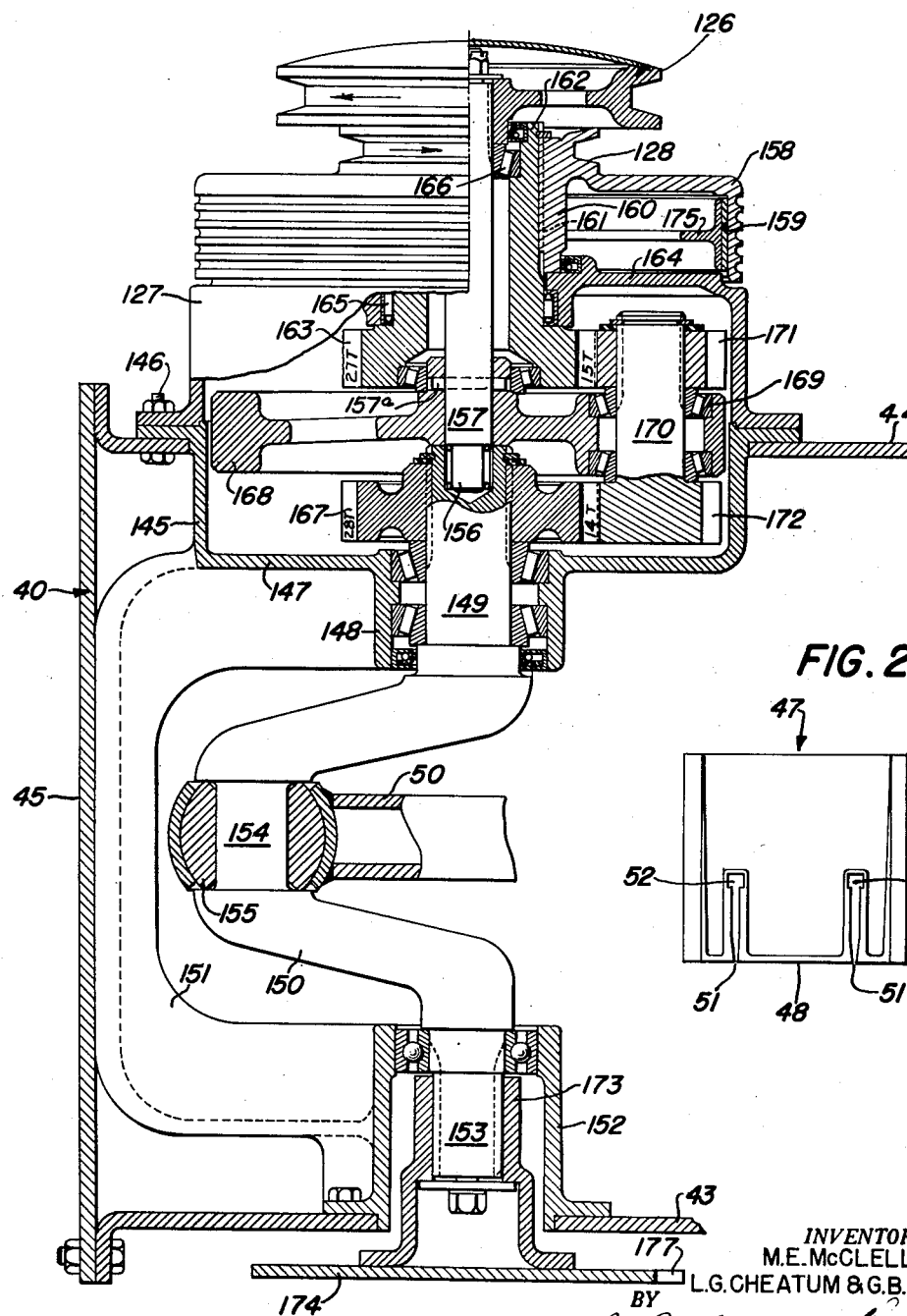
Figure 4 is an enlarged sectional view of the driving mechanism for the bale-forming means and the tying means, the view being taken substantially along the line 4—4 of Figure 3.

The bale case is, as is more or less conventional, made up of a plurality of walls arranged to provide a rectangular and elongated baling chamber defined by top and bottom walls 41 and 42, front and rear walls 43 and 44 and a right-hand end wall 45 (see also Figure 4).

The front wall 43 is, of course, vertical and is disposed transversely with respect to the direction of travel of the baler. This front wall includes a rectangular feed opening 46 which is substantially in longitudinal alinement with the converging feeder belts 36 and 37 (Figure 2).

The bale-forming means further includes a bale-forming member here shown as a plunger 47 that is carried by the bale case 40 for reciprocation in a cycle including alternate compression and retraction strokes. The plunger may be of any suitable construction and is here shown as being in the form of a reenforced casting having a substantially flat leading or material-engaging face 48 and a hollow trailing portion that is provided with a bearing or pivot 49 for connection of the plunger 47 to driving means including as part thereof a reciprocating pitman or connecting rod 50, the means for driving which will be described subsequently.

In order that the illustrations in Figures 7–9 may be clarified, reference should be had to the top plan view of the plunger in Figure 20, wherein it is shown that the front face of the plunger is interrupted by a pair of transversely spaced, vertically running grooves 51, each of which extends back toward the trailing edge of the plunger into an enlarged vertically extending guide or track 52. These guides and grooves are for the purpose of accommodating certain parts of the tying mechanism, reference to which will be made below.

As will be evident from an examination of Figures 7–10, material fed by the means 36 and 37 through the intake or feed opening 46 enters the bale case 40 in the path of the reciprocating plunger 47. In Figure 7, the plunger is shown at the end of its retraction stroke, so that the feed opening 46 is uncovered by the plunger. The beginning of the formation of a bale is designated by the legend B¹, the material having already been compressed by a previous compression stroke of the plunger against a previous bale B which acts as a header for subsequent bales. It will also be noted that the end of the compression stroke of the plunger 47, as indicated in Figure 8, coincides substantially with the left-hand vertical edge of the opening 46, whereupon the plunger at the end of its compression stroke covers the feed opening 46. In Figure 8, the formation of the bale B¹ has been completed. Figure 9 is substantially a duplication of the illustration in Figure 8, with the exception of certain functions of the tying mechanism which will be brought out hereinafter. Figure 10 illustrates the completion of the tying operation on the bale B¹ and the initiation of the formation of a new bale B².

*Tying mechanism—in general—Figures 1, 2, 3, 5–10, 19 and 25*

(Reference numerals 53–107)

The tying mechanism is a self-contained unit designated in the general illustration by the numeral 53 and comprises, basically, a housing 54 within which is enclosed appropriate gearing for twisting and kinking the tying wire. The particular details of the tying mechanism illustrated herein form no specific parts of the present invention and could very well be other than illustrated, except as will be pointed out below. Likewise, the tying mechanism need not handle wire but could as well handle twine or any other suitable medium.

In so far as a disclosure of the particular tying mechanism illustrated is necessary to an immediate understanding of the present invention, the fundamental components thereof will be described. As best shown in Figure 19, the housing 54 contains a large gear 55 which is in constant mesh with a pair of twister gears 56, only one of which is shown but the presence of the other of which will be obvious from an inspection of Figure 19. Each of the gears 56 is slotted at 57, and at times the slots 57 become alined with slots 58 in the bottom of the housing 54.

The housing 54 also carries a pair of transversely spaced apart vertical shafts 59 which will be hereinafter referred to as kinker shafts. These shafts project upwardly out of the casing 54 and have keyed thereto small pinions 60 which are respectively in constant mesh with opposite ends of a segmental gear 61. The lower end of each kinker shaft includes a slotted kinking portion 62, only one of which appears in Figure 19. The drawing in Figure 19 has been broken out at the left-hand portion thereof to reveal a kinking portion 63 at the lower end of one of a second pair of kinker shafts which are plainly visible at 64 in Figures 1, 2 and 3.

The wire-twisting and wire-kinking means of the tying mechanism 53 is motivated by actuating means including a transverse shaft 65 journaled in a pair of bearings 66 carried on the top of the bale case 40 and spaced apart fore and aft as respects the direction of travel of the baler. This shaft has keyed thereto intermediate its ends a mutilated gear 67 which is intermittently engageable with a bevel pinion 68 keyed to a shaft 69 which extends at right angles to the shaft 65. The shaft 69 extends into the tier housing 54 and is splined to the large gear 55. The right-hand or opposite end of the shaft 69 is journaled in a bearing bracket 70 which is journaled on the shaft 65 and which includes an enlarged housing or casing portion 71 for enclosing means to oscillate the segmental gear 61. The means for oscillating the segmental gear 61 includes a link 72 which derives power from mechanism from within the casing or housing 71. Such mechanism has not been illustrated specifically, since details thereof are unimportant here. The general idea can be readily perceived at 72ª in Figure 1 and may include a cam and spring-loaded plunger intermittently engageable in timed relationship to effect intermittent rotation of the pinion 68.

The portion of the tying mechanism described so far is supplied with wire from a pair of staggered wire boxes 73 carried at an upper portion of the right-hand end of the bale case 40. These wire boxes may be replaced by and equivalent means; the type shown here is similar to that forming the subject matter of assignee's copending application, Serial No. 9,487, filed February 19, 1948, and which issued as Patent 2,477,059, dated July 26, 1949. Each of the boxes 73 carries a coil of wire C from each of which a strand of wire W is fed to the tying means 53. The wires W extend to the tying means in spaced relation according to the spacing of the slots 58 in the housing 54.

Incidentally, the wire boxes 73 have been omitted from Figure 1 so as to expose the tying mechanism 53.

Figure 5:
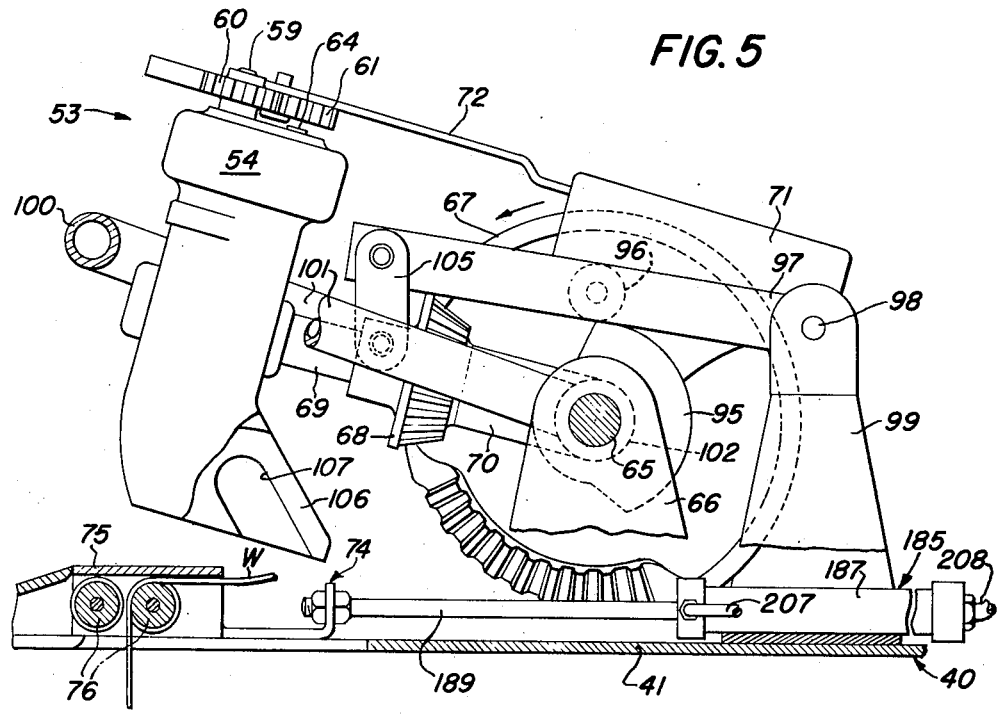
Figure 5 is an enlarged fragmentary view, partly in section as viewed along the line 5—5 of Figure 2, showing the structure and illustrating the operation of the tying mechanism.
Figure 6:
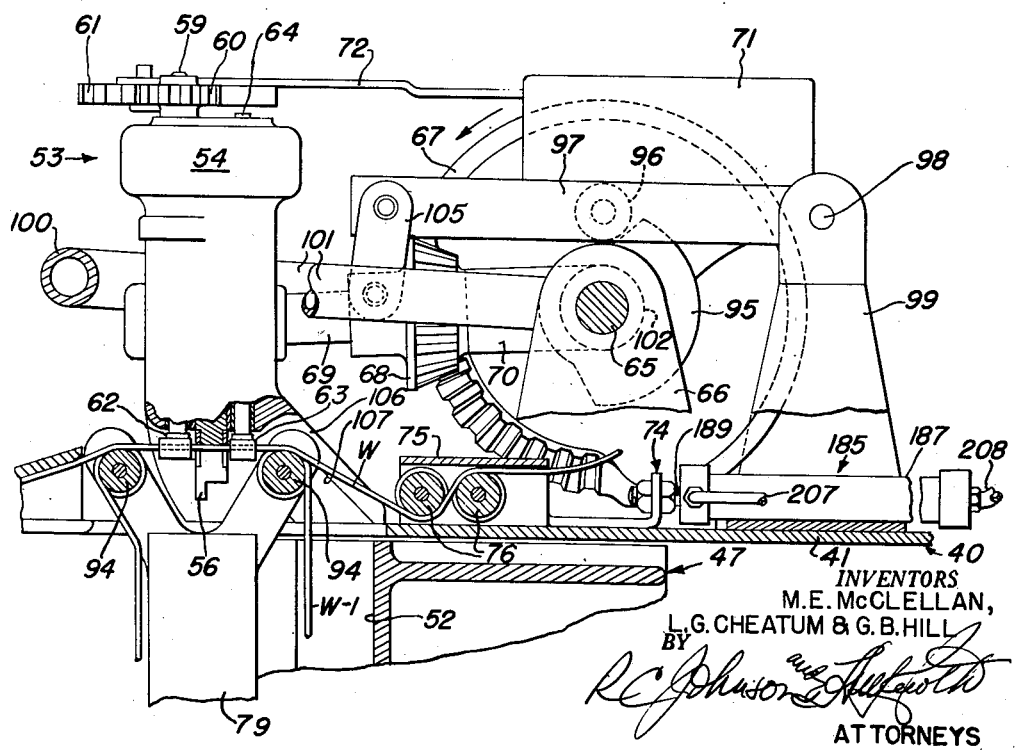
Figure 6 is a view similar to Figure 5 but showing another stage in the operation of the tying mechanism.

In the particular type of tying mechanism illustrated here, the housing 54 is positionable between an upper position, relatively remote from the bale case (Figure 5) and a lower position, relatively close to the bale case (Figure 6). In its former position, the housing 54 is out of the way of a carrier 74 which carries a pair of transversely spaced apart wire guides 75, these guides being spaced apart according to the spacing of the wires W. Although but one wire guide 75 is visible in the drawings, the presence of both in a typical construction will be readily perceived.

Each wire guide receives a pair of rollers 76 over which the proximate wire W is trained. As will be evident from Figure 7, each of the upper wires W extends downwardly through an opening 41ª in the bale case top wall 41 and thence over the left-hand end of a bale to be formed. The wire W is united in a knot or tie K to the free end of a cooperating lower wire W¹.

There are two wires W¹ which are fed from a pair of coils C¹ contained in a pair of lower wire boxes 77 (Figure 3) carried below the bale case 40. Although only one coil C¹ and one wire box 77 appear in the drawings, the presence of two of each will be readily apparent. The tying mechanism is provided with a lower wire guide arrangement 78 which, for present purposes, may be assumed to be very similar to that provided at the top of the bale case (Figures 7–10). The details of the lower guide arrangement will be brought out below in the description of Figures 21–25.

The lower component of the tying mechanism includes strand-passing or -carrying means comprising a pair of vertically movable needles 79, only one of which appears in the drawings. The bottom wall 42 of the bale case is open at 42ª, and guide means, in the form of a needle-guide casting 79ª, is provided for guiding the needles in their upward movement to the plunger tracks 52. Each needle is pivoted at its lower end at 80 to a control link 81 which is in turn pivoted at 82 to a bracket 83 carried at a rear righthand portion of the main frame 25 (Figure 3). Oscillation of the needles is accomplished by a crank 84 keyed to a short shaft 85 at the rear of the bale case 40. This shaft further has keyed thereto a sprocket 86 which is driven by means of a drive chain 87 from a sprocket 88 keyed to the upper tier shaft 65. A cam 89 is fixed to the rear wall 44 of the bale case 40 and the crank 84 is slotted at 90 to develop proper control of the link 81, which is accomplished by a connecting link 91 between the crank 84 and the control link 81. The connection of the link 91 to the crank 84 is effected by means of a connecting pin 92 passing through the slot 90 and a roller 93 which engages the surface of the cam 89.

It will be seen from the description thus far that rotation of the shaft 85 causes rotation of the crank 84 to move the needle from the positions shown in Figures 3 and 7 to the position shown in Figure 9. Since the needle is operated by means of the shaft 65, there will be a definite relationship between operation of the twisting and kinking mechanism and operation of the needle.

The upper portion of the needle is provided with a pair of wire-engaging rollers 94, which are spaced apart lengthwise of the lower wire $W^1$ so as to engage this wire and bring it upwardly to be received by the twister gear 56 and kinkers 62 and 63 in the manner shown in Figure 9.

The functioning of the mechanism 53 and the needles 79 to effect forming of the ties or knots K is accompanied by changes in position of the housing 54, as illustrated in Figures 5 and 6. For this purpose, the shaft 65 carries a pair of spaced apart cams 95. These cams are keyed to the shaft 65 for rotation therewith and respectively engage rollers 96 on raising and lowering arms 97. Each arm 97 is pivoted at its right-hand end at 98 to a bracket 99 carried on the top of the bale case 40. A U-shaped or bale member 100 is arranged so that its transverse portion or bight lies closely adjacent the housing 54 and so that the legs thereof, designated at 101, extend lengthwise of the bale case to pivotal connections by means of bearings 102 on the transverse shaft 65. The housing 54 is provided with a pair of ears 103 by means of which and bolts 104 the housing is mounted on the legs 101 of the bail 100.

The bale 100, and hence the housing 54, is raised and lowered by the arms 97 through the medium of short connecting links 105.

The housing 54 includes a lower portion which is recessed at 106 to accommodate the upper portion of the needle 79 and this recessed portion further includes a track or guide 107 which complements the proximate track or guide 52 in the plunger 47. The track portion 107 is disposed at an angle to the vertical so that it occupies the position shown in Figure 6 and thereby forms substantially a continuation of the track 52 in the plunger.

The following is a brief and general description of the tying mechanism to the extent thus far described and to the extent believed necessary to expedite an understanding of the mechanism.

While the plunger 47 is reciprocating, the tying mechanism housing 54 is in its upper position, as illustrated in Figures 5, 7, 8 and 10. The plunger is forming the bale $B^1$ and the upper and lower wires W and $W^1$ which have been united at K are moved along to the left in the bale case. When the baler is first started without having been previously operated and there is no bale B in the bale case to act as a header, the tie or knot is performed manually at K. Pressure of the material to the left thus carries the loop, formed by the united wires W and $W^1$, to the left and the bale is gradually accumulated by the plunger until it reaches a predetermined size, the wires W and $W^1$ paying out from the coils C and $C^1$ as the size of the bale increases. Since the carriers 74 and 78 are relatively close to the bale case wall openings $41^a$ and $42^a$, there is no undesirable slack in the wires. When the bale reaches the desired size, the plunger 47 is caused to be held at the end of its compression stroke (by mechanism to be set forth below). Simultaneously, the shaft 65 is caused to operate (by mechanism to be described below) so that the cams 95—which have been holding the arms 97 in the raised position of Figure 5—rotate in the direction of the arrows (Figures 5 and 6) until the rollers 96 drop off onto the lower portions of the cams. Also, substantially simultaneously, means (to be described subsequently) operates to retract the wire guide carriers 74 and 78 to the right, thus moving these components respectively out from below the downwardly moving housing 54 and the upwardly moving needles 79.

Since the shaft 65 is connected by the sprockets 86 and 88 and chain 87 to the needle crankshaft 85, the needles will be actuated to move upwardly or vertically across the bale case through the needle guide casting $79^a$ and thence through the needle guide tracks 52 in the plunger 57. As the needles move upwardly, they engage the loose intermediate portions of the lower wires $W^1$ and carry these portions upwardly, wire paying out from the lower coils $C^1$ as this action takes place. When the upper housing has moved downwardly to the position of Figure 6, the upper wires W are received through the slots 58 in the housing 54 by the slotted twister gears 56 and slotted kinkers 62 and 63. When the needle has moved upwardly to the position shown in Figure 6, the lower wires $W^1$ have been carried up through the slots 58 to be received by the twister gears and kinkers. Upon lowering of the housing 54, the mutilated gear 67 has traveled through a sufficient angular range to incur rotation of the pinion 68, which causes actuation of the large gear 55 and consequently rotates the twister gears, the latter rotating preferably through four complete revolutions during the dwell period produced by the low portions on the cams 95. Following rotation of the twister gears, the means $72^a$ causes reciprocation of the link 72 which in turn rocks the segmental gear 61 first in one direction and then in the other, thereupon incurring angular movement of the kinkers 62 and 63 first in one direction then in the other. The kinkers 62 and 63 are of the type which perform a wire-severing operation as a final stage in their wire-kinking operation, whereupon a second knot $K^1$ (Figure 10) is formed at the right-hand end of the bale $B^1$. Simultaneously, and since the twisted wires are severed intermediate the ends of the twisted portions, a third knot $K^2$ is formed which again unites the wires W and $W^1$ to provide a loop at the leading portion of the bale $B^2$ about to be formed. In this respect, it should be noted that Figure 10 represents a stage in the bale-forming operation somewhat subsequent to that represented by Figure 9; that is to say, the occurrence of the accumulation of material represented at $B^2$ takes place following the bale-tying operation and not during the bale-tying operation.

After completion of the bale-tying operation, the shaft 65 has rotated sufficiently to disengage the mutilated gear 77 from the pinion 68 and to cause the high portions of the cams 95 to again engage the rollers 96 for raising the arms 97 and hence the bail 10 and the housing 54. Also, the shaft 85 has rotated sufficiently to bring the roller 93 on the power-transmitting link 91 around to the other side of the cam 89, following which the needles 79 will be retracted from the bale case 40 and will be freed from the needle guides 52 in the plunger 47.

The cam 89 is shaped as shown so that its upper portion is substantially flat, whereby rotation of the crankshaft 85 may continue without effecting withdrawal or retraction of the needles during the time that the wires are being twisted, kinked and severed. The shape of the cam 86 is, of course, not new in the present case and, as a matter of fact, any other suitable form of tying-mechanism-positioning means could be utilized in so far as the broad applicability of the invention is concerned.

Driving mechanism—Figures 1-4 and 18

(Reference numerals 108–129)

The source of power in the first instance in the type of baler illustrated is derived from the tractor or other propelling vehicle. For this purpose, the baler has a longitudinally extending propeller shaft 108 shown here as extending through the draft member 28, the latter being tubular for that purpose. The rear end of the propeller shaft 108 is connected by a suitable universal joint 109 (a portion of which is visible in Figure 1) to the forward end of a longitudinally extending shaft 110. This shaft has keyed thereto a sheave 111. Rotation of the sheave 111 and shaft 110 is in the direction indicated by the arrow in Figure 3. The shaft 110 is suitably carried in appropriate bearings (not shown) in a longitudinal tubular member 112 which forms part of the main frame 25.

The main frame 25 carries a second forwardly extending tubular member 113 which is provided with suitable bearings (not shown) for journaling a longitudinally extending shaft 114, the forward end of which is associated with suitable gearing 115 (Figure 1) for transmitting power to a transverse shaft 116 (Figures 1 and 2). The shaft 116 extends to the left, as shown in Figure 2, and has keyed thereto a driving sheave 117. A belt 118 connects the sheave 117 and a sheave 119, the latter being appropriately connected by means (not shown) for driving a plurality of sheaves 120 for the belts 33 and 35. There is indicated in dotted lines in Figure 2 an idler sheave 121 for carrying that portion of the belt 35 within the feeding unit 30, the details of which are unimportant here.

The transverse shaft 116 serves, through the sheaves 117 and 119 and belt 118 to drive the sheaves 120 which in turn drive the pick-up cylinder 31 through the belts 33. The belt 35 is driven by the intermediate sheave 120 and is carried by the sheave 121. The latter is not carried by the transverse shaft 116 but is slightly spaced thereabove.

The rear end of the shaft 114 has keyed thereto a first sheave 122 and a second and larger sheave 123. A belt 124 is trained about the sheaves 111 and 122 and a second belt 125 is trained about the sheave 123 and a smaller sheave 126 journaled on means including a casting or housing 127 at the right-hand end of the rear portion of the bale case 40. A sheave 128 is likewise journaled by the housing 127 and is coaxial with the sheave 126. The sheaves 126 and 128 are relatively rotatable, the means for mounting which will be subsequently described.

The sheave 128 is connected to and drives a larger sheave 129 which is carried on the rear end of the shaft 65 by bearing means 130 so that the sheave 129 and shaft 65 are at times relatively rotatable (see Figure 18). The driving means for interconnecting the sheaves 128 and 129 comprises a belt 131.

The direction of rotation of the sheaves 128 and 129 is opposite to that of the sheaves 111, 123 and 126, for reasons that will be explained below.

Clutch for tying mechanism—Figure 18

(Reference numerals 129–144)

Part of the driving mechanism for connecting the source of power to the tying mechanism includes a connectible and disconnectible device between the sheave 129 and the tier shaft 65. A preferred form of such device is illustrated in the drawings as comprising a shiftable clutch member 132 which is carried for rotation with and shiftable axially with respect to the shaft 65 and which has engageable portions 133 selectively engageable with complementary portions 134 on the hub of the sheave 129. Additional supporting structure for the rear end of the shaft 65 is indicated generally by the numeral 135 and is shown as being provided with a forward bearing 136 and a rearward bearing 137, the latter of which cooperates with the bearing 130 to carry the shaft 65 and the sheave 129.

As also shown in Figure 18, the sprocket 88 which is utilized to drive the needle crankshaft 85 is pinned or may be otherwise secured to the shaft 65 for rotation therewith, as indicated at 138.

The support 135 includes at the right-hand side thereof a bracket 139 on which is mounted a clutch control arm 140, this arm being pivoted at 141 at its rear end and extending through the supporting structure to a conventional control connection with the shiftable clutch part 132. It will be evident that the arm, when in the position shown in Figure 18, is effective to maintain disengagement between the shaft 65 and sheave 129 and, when shifted to the rear (or to the left, as viewed in the drawings), is effective to establish driving connection between the shaft 65 and sheave 129.

The means for operating the arm 140 includes a fluid-receiving motor—designated generally by the numeral 142—suitably mounted on the supporting structure 135 and effective to shift the arm 140 in a counterclockwise direction, as viewed in Figure 18, through the medium of a motion-transmitting element 143. A compression spring 144 serves as means for yieldably maintaining the indicated position of the control arm 140.

Further description of the arrangement and operation of the motor 142 will be included below in the description of the control mechanism.

Plunger and tier drive mechanism—Figure 4

(Reference numerals 47, 53, 126, 128, 145–175)

As previously stated, the sheaves 126 and 128 are mounted coaxially by means including the housing 127. As shown in Figure 4, the housing 127 forms substantially the outer one-half of a complete housing structure including an inner housing part 145. The housing parts 127 and 145 are appropriately flanged and secured together and to the rear wall 44 of the bale case 40 as at 146.

The housing part 145 includes an inner or forward wall 147 which is formed with an integral sleeve 148 for the purpose of journaling the rear main bearing 149 of a crankshaft 150. The housing part 145 further has formed integrally therewith a forwardly extending yoke 151 which has a flanged sleeve 152 secured to the inner or rear face of the front wall 43 of the bale case 40. The sleeve 152 journals the forward crank pin 153 of the crankshaft 150.

The crank 150 includes a single crank pin or throw 154 which is equipped with a partially spherical bearing 155 for effecting an articulate connection with the plunger pitman 50.

The rear end of the main bearing 149 is provided with a pilot bearing 156 which carries the forward end of a shaft 157 to which the sheave 126 is keyed. Since the sheave 126 derives its power in the first instance from the propeller shaft 108, the shaft 157 will rotate continuously as long as the propeller shaft 108 is driven (barring, of course, acidental disconnection of intermediary driving components). The shaft 157 therefore constitutes a constantly operating input member and the crankshaft 150 constitutes an intermittently rotatable output member, the shaft 157 and chrankshaft 150 being, obviously, relatively rotatable, since one is piloted on the other.

The sheave 128 forms part of a second intermittently rotatable output member which will be hereinafter designated as a whole by the numeral 128. This member includes, preferably as an integral part thereof, a circular drum portion 158 which is substantially as large in diameter as the housing part 127 and which has its inner annular surface machined to provide a braking surface 159. An inner portion of the member 128 is integrally formed as a sleeve 160 which is keyed at 161 to a quill 162 which has its inner or forward portion formed as a pinion 163. For most practical purposes, the pinion 163 may be considered an integral part of the output member or sheave 128.

The housing part 127 includes a rear wall 164 which is centrally apertured to receive the quill 162 and which is provided with a bearing 165 for journaling the quill.

The constantly rotating shaft 157 passes loosely through the quill 162 and, in addition to being journaled or piloted in the rear end of the crankshaft 150, is journaled by means of a bearing 166 in the rear end of the member 128. The shaft 157 is therefore rotatable with respect to both the member 128 and the crankshaft 150 and the members 128 and 150 are rotatable relative to each other.

The pinion 163 forms part of means for interrelating the operation of the output members 128 and 150 for alternate operation so that the plunger may reciprocate while the tying means is idle and the tying means may operate while the plunger is idle. The interrelating means preferably comprises an epicyclic gear train including, in addition to the pinion 163, a pinion 167 which is keyed or splined to the rear end of the crankshaft 150. The pinions 163 and 167 are spaced apart axially and the forward end of the shaft 157 extends across this space and has pinned thereto at 157a a carrier member 168, which preferably has some weight to serve as a flywheel for the crankshaft 150 when connected thereto, in a manner to be presently described.

The carrier 168 is provided at a point spaced radially from the axis of the shaft 157 with bearing means 169 for journaling a short shaft 170 to the rear end of which is keyed a small pinion 171. A substantially similar pinion 172 is carried at the forward end of the shaft 170 for rotation with the shaft, being preferably formed as an integral part of the shaft. The pinion 171 is in constant mesh with the pinion 163. The pinion 172 is in constant mesh with the pinion 167. The pinions 163 and 167 are of slightly different sizes and, for present purposes, the pinion 167 may be taken as having twenty-eight teeth and the pinion 163 as having twenty-seven teeth. Likewise, the pinions 171 and 172 are of different sizes. For present purposes, the pinion 172 has fourteen teeth and the pinion 171 has fifteen teeth. The relative differences in the sizes of the pinions account for the reversal of direction of the sheave 128 with respect to the rotation of the constantly rotating or input sheave 126, as previously briefly referred to and as illustrated by the arrows in Figures 3 and 4.

The forward end of the crankshaft 150 includes a forward extension 173 which is keyed or otherwise fixed to the front main bearing 153 for rotation therewith. This member 173 extends forwardly through the sleeve 152 and an appropriate opening in the front bale case wall 43 to carry a circular plate 174 which forms part of a holding or retaining means to be subsequently described.

A holding means for the output member 128 is here shown in the form of a brake 175. This brake may be of any conventional construction and is illustrated as being of the internal-expanding type engageable with the braking surface 159 which forms the annular interior of the drum 108. The means for actuating the brake, as well as the means for actuating the holding means including the plate 174, will be subsequently described.

*Brief description of the driving mechanism*

(Reference numerals 108, 126, 128, 145–175)

Power is constantly supplied by the propeller shaft 108 to the constantly rotating member 126, thereby constantly rotating the shaft 157 and the carrier 168 in a clockwise direction as viewed from the rear or to the left as indicated by the arrows in Figure 4. Normally the brake 175 will be energized or effective to lock or hold the drum 158 and consequently the output member 128 will be demobilized or maintained in a stationary condition. Demobilizing of the drum 158 results also in demobilizing of the pinion 163, with the result that the pinion 171, as it travels around the stationary pinion 163, transmits power through the shaft 170 to the pinion 172 and thence to the crankshaft pinion 167, thereby rotating the crankshaft to reciprocate the pitman 50 and plunger 47. It will be appreciated, of course, that a considerable gear reduction is obtained and that, therefore, the speed of rotation of the crankshaft 150 will be appreciably lower than the speed of rotation of the input shaft 157.

By means of control mechanism to be subsequently described, the driving mechanism is permitted to continue in the operational status just described for a predetermined length of time, after which the brake 175 is released simultaneously with the application of a holding force on the plate 174. Such action results in a reversal of the power-transmitting effect of the epicyclic gear train so that the crankshaft 150 now becomes demobilized and the output member or sheave 128 becomes mobilized. Since the pinion 167 is now held stationary, the pinion 172, as it travels around the pinion 167, transmits power through the shaft 170 to the pinion 171 and thence to the pinion 163. Because of the relative pitch diameters of the pinions, there will be a reversal of the direction of rotation of the output member 128. The member 128 will, like the crankshaft 150, be the recipient of the considerable gear reduction obtained through the epicyclic gear train. Hence, the speed of rotation of the output member 128 will be considerably below that of the constantly rotating sheave 126.

By means of the control mechanism to be subsequently described, the output member 128 is permitted to rotate through a predetermined phase dependent upon the operation of the tying means, after which the control mechanism sets up a reversal of the mobilizing and demobilizing effect of the holding means or brakes 174 and 175 so that another cycle of operation of the plunger is initiated while the tying means is idle. In this respect, it should be remembered that the tying mechanism clutch 132—134 is connected in series with the sheave 128 and shaft 65 and that the clutch is engaged substantially simultaneously with mobilizing of the sheave 128. For all practical purposes, the drive between the epicyclic gearing and the tying mechanism may be considered without the clutch, as if the sheave 129 were keyed directly to the shaft 65. However, as will be brought out below, the presence of the clutch 132—134 is of importance as a safety feature, since it prevents operation of the tying means in the event of slippage of the brake 175, in which event some power would be transmitted by the sheave 128 to the tying means, which would be undesirable, inasmuch as the needles 79 would be projected into the bale case at a time when the plunger is reciprocating.

*Control means—Figures 2 and 11—17*

(Reference numerals 142, 174–252)

The circular plate 174 that is connected to the forward end of the plunger crankshaft 150, is provided with a relatively large first notch or cut-out portion 176, and with a second smaller notch 177. The notch 176 provides part of the control means, as will be subsequently set forth, and the notch 177 also provides part of the control means and comprises a subsidiary part of indexing or locking means including a beam or lever 178 which is pivoted intermediate its ends at 179 and which has at its lower end a lug 180 selectively engageable with or disengageable from the notch 177 in the plate 174.

The upper end of the lever 178 is arranged to receive power from a fluid-receiving motor 181 which has a rod or link 192 engaging the lever. A compression spring 183 provides means for normally maintaining the lug 180 on the lever 178 in engagement with or conditioned for engagement with the notch 177 in the plate 174.

The brake 175 at the rear end of the driving mechanism, which includes the epicyclic train, is under the control of a fluid-pressure-receiving motor 184 (Figure 12). This brake, being of the internal-expanding type, is, as is conventional, normally relaxed by a tension spring (not shown).

As previously stated above in connection with the description of the tying mechanism, the wire guide carriers 74 and 78 are shiftable back and forth in timed relationship with raising and lowering of the tying mechanism gear housing 54 (Figures 5–10). The means for accomplishing the shifting of the wire guide carriers comprises a pair of fluid-pressure-receiving motors 185 and 186. For the purpose of simplifying the disclosure, only the motor 185 appears in the diagrammatic illustration in Figure 12, but it will be understood that these motors are actuated simultaneously. Further, additional description of these motors will be directed primarily to the motor 185, it being understood that the motor 186 has similar parts, the details of which will be described below.

The motor 185 comprises a cylinder 187 within which is slidably carried a piston 188 having a piston rod 189, the outer end of which is connected to the wire guide carrier 74. The motor 185 is of the two-way type and the interchange of fluid pressure therein effects shifting of the carrier in one direction or the other.

The motors 142, 181, 184 and 185, for the tier clutch, index plate 174, brake 175, and wire guide carrier 74, respectively, are part of a fluid-pressure system embodied in the control means. This system further includes a constantly running pump designated generally by the numeral 190. The pump includes a sheave 191 (Figures 3 and 12) which is in constant engagement with and driven by the drive belt 124. The pump is carried by an arm 192 pivotally mounted on a bracket 193 at the rear of the main frame 25. A tension spring 194 serves as means for maintaining the sheave 191 in engagement with the belt 124.

The pump 190 comprises part of a fluid-pressure source which also includes a fluid reservoir 195 mounted in any suitable manner on the rear of the baler. The pump draws fluid from the reservoir 195 through a conduit 196.

The pump supplies fluid under pressure through a conduit 197 to a high-pressure passage 198 in a main control valve 199. The valve carries a shiftable valve member 200 formed with a low-pressure or return bore 201 which communicates with a low-pressure or return chamber 202 in the valve 199. The chamber 202 communicates with the reservoir 195 via a return conduit 203.

Fluid pressure is distributed by the valve 199 to the motors 142, 181, 184 and 185. Connection from the valve 199 to the motors 181 and 184 is made in parallel by a main conduit 204 and a pair of branch conduits 205 and 206 leading respectively to the motors 181 and 184. A conduit 207 leads to one end of the motor 185 and a conduit 208 leads to the other end of the motor 185 from the valve 199. A conduit 209 connects one end of the motor 185 in series with the motor 142.

The valve 199 and the shiftable valve member 200 are appropriately ported to accomplish the results to be set forth below. The arrangement is believed to be obvious from the drawings and no detailed description will be made of the arrangement of the ports.

In the position of the valve member in Figure 12, the fluid under pressure supplied by the pump 190 is distributed from the high-pressure passage 198 to supply the motors 181 and 184 and to supply the motor 185 through the conduit 208 so that the piston 188 is shifted in such manner that the wire guide carrier 74 will be in its extended position below the tier housing 54. Looking at Figure 12, the pressure applied to the motor 185 is such as to shift the piston 188 to the right. The right-hand end of the cylinder 187 is exhausted through the conduit 207 to the low-pressure bore 201 and low-pressure chamber 202 in the valve 199. At the same time, the motor 142 is exhausted through the conduit 209, through the cylinder 187 and through the conduit 207 to the chamber 202, and thence to the reservoir 195. The piston in the motor 142 is in the position shown in Figure 12, because of the pressure applied by the spring 144 (Figure 18).

The pump 190 includes a pressure-relief valve 210 for obvious purposes.

When the control valve shiftable member 200 is in the position of Figure 12, the fluid-pressure motors 181 and 184 are under pressure, the former operating to pivot the lever 178 so that the lug 180 is disengaged from the notch 177 in the circular plate 174, and the latter operating to apply the brake 175 to the drum 158. Hence, the output member or sheave 128 to the tying mechanism is demobilized or held stationary, and the epicyclic gear train is effective to drive the crankshaft 150 for reciprocating the plunger 47. At the same time, the motor 185 for the wire guide carrier 174 is under pressure such as to extend the piston rod 189 so that the wire guide rollers 76 are in position below the tying mechanism casing or housing 54. Concurrently, the fluid-pressure motor 142 is exhausted through the conduit 209, the right-hand end (as viewed in Figure 12) of the cylinder 188 and through the conduit 207 to the reservoir 195. Therefore, the tier clutch 132—134 is disengaged. Since the operating parts are controlled in the manner aforesaid, the plunger is operating and the tying mechanism is idle. This status of the operation will continue until the control valve shiftable member 200 is shifted to a new position so that the ultimate result is to create a new operational status in which the plunger is idle and the tying mechanism operates. That portion of the control means that accomplishes the last mentioned result will be described below.

The front wall 43 of the bale case 40 carries a bearing ring 211 (Figure 17) which surrounds the extension 173 at the forward end of the crankshaft 150 and which is therefore concentric with the axis of rotation of the crankshaft. This ring serves as means for mounting a control member which is in the form of a vertically elongated plate 212 (Figures 11 and 17). This plate is rockable within limits about the axis of the crankshaft and is connected to the shiftable control valve member 200 for the purposes of actuating the latter. The connection, as best shown in Figure 17, includes an upper rearwardly bent portion 213 which has a downwardly bent ear 214 pivotally connected to a clevis 215 at the right-hand end of the valve member 200 (left hand end as viewed in Figure 12). A tension spring 216 provides means for maintaining the control plate 212 normally in such position that the shiftable valve member 200 occupies the position of Figure 12. One end of the spring is connected to the upper end of the control plate and the other end of the spring is connected to a plate 27 forming part of the front bearing 66 for the tier shaft 65.

The plate 212 is provided near its upper portion with a pair of transversely spaced, forwardly extending ears 218 on which is pivotally carried a bell crank 219. This bell crank forms part of connectible and disconnectible motion-transmitting means, another part of which comprises the circular plate 174. The pivot of the bell crank 219 on the ears 218 is, as shown at 220, in Figure 17, transverse to the axis of the crankshaft 150, so that the lower portion of the bell crank may be swung toward or away from the plate 174. The lower end of the bell crank includes a lug 221 which is selectively engageable with or disengageable from the notch 176 in the plate 174.

The bell crank 219 is so formed that it has a rearwardly extending arm 222 which is bent upwardly to provide an attaching ear 223. The position of the bell crank 219 is determined by the position of an actuating member 224. This member is preferably triangular in shape and is pivoted at 225 at one apex to a bracket 226 suitably mounted at an upper right hand portion of the bale case 40. Another apex of the triangular member carries a pin 227 which is received by a slot 228 in the ear 223 on the bell crank 219. It will thus be seen that rocking of the member 224 about the pivot 225 effects rocking of the bell crank 219 about its pivot 220. Hence, rocking of the triangular member 224 controls engagement or disengagement between the bell crank lug 221 and the notch 176 in the circular plate 174.

The third apex of the triangular member 224 is pivotally connected at 229 to the outer or right-hand end of an operating link 230. The opposite or left-hand end of the link 230 is pivotally connected at 231 to the lower end of an arm 232 that is loose on the tier shaft 65 adjacent the forward end thereof, as best shown in Figures 14 and 16. The lower end of the swingable arm 232 is biased toward the left-hand end of the bale case by means including a tension spring 233, one end of which is connected to the arm 232 and the other end of which is anchored at 234 to the top of the bale case 40. Hence, the action of the spring 233 is normally such as to bias the arm 232 for swinging toward the left-hand end of the bale case, thereby acting through the link 230 to pivot the triangular member 224 in a clockwise direction (as viewed in Figure 11) and thereby rocking the bell crank 219 in a counterclockwise direction (as viewed in Figure 17) for effecting engagement of the bell crank lug 221 with the notch 176 in the circular plate 174. However, this action of the spring 233 is under the control of means responsive to a predetermined phase in the bale-forming cycle, which will be presently described.

In the conventional baler, the primary interest is in the size of the bales formed in the baling chamber and various types of mechanisms have been heretofore worked out for controlling the operation of the baler in response to the satisfaction of this requirement. One of the most successful devices for this purpose is the so-called measuring wheel; although, other devices have been used. For the present purposes, the responsive device illustrated is in the form of, or includes, a measuring wheel 235. This wheel is carried on a short shaft 236 journaled between the left-hand ends of arms 237 which are suitably pivotally carried at 238 on an upper portion of the bale case 40.

The measuring wheel has a plurality of peripheral teeth, as shown, which extend through an appropriate slot in the upper wall 41 of the bale case 40. As the material accumulates in the bale case in response to compression by the plunger 47, the mass of material is gradually worked toward the left-hand or discharge end of the bale case. As the mass moves, the teeth of the measuring wheel 235 engage the material, thus rotating the measuring wheel in increments. Ordinarily, the circumference of the wheel is such that one complete revolution thereof determines a bale having a predetermined desired length. Although the length of the bale bears a direct relationship to its density and therefore will have some effect on the size of measuring wheel used, these considerations may be dispensed with in the present case. Ordinarily, the density of the bale is controlled by relaxing or tensioning portions of the bale case at the discharge end thereof, such as by devices represented by the numeral 239 in Figure 3.

At any rate, the outwardly or leftwardly moving bale causes the measuring wheel 235 to rotate in the direction of the arrow indicated in various figures of the drawings. The shaft 236 carries thereon a driven arm 240. This arm is separate from the wheel 235 to the extent that both are not keyed to the shaft 236. However, the two are interconnected by driving means including a torsion spring 241, so that the ultimate result of rotation of the wheel 235 is to rotate the arm 240 in the same angular phase about the axis of the shaft 236, the torsion spring 241 serving to provide a resilient connection between the wheel 235 and arm 240 as a safety expedient.

The forward end of the shaft 236 has a bearing 242 for rotatably carrying the left-hand end of a transversely extending control rod 243. The opposite or right-hand end of the rod 243 is rotatably carried by a suitable bearing 244 (Figure 16) pivotally mounted on the swingable arm 232 on the front end of the tier shaft 65.

The outer end of the driving arm 240 is provided with a lug 245 which engages a lug 246 rigid on the rod 243. Engagement between the lugs 245 and 246 occurs, of course, during each 360° rotation of the measuring wheel 235 and effects rocking of the rod 243 about its principal axis in the direction of the arrow shown in Figures 15 and 16.

The right-hand end of the rod 243 projects to the right through the bearing 244 on the arm 232 and has keyed thereto a dog or pawl member 247. A torsion spring 248 (Figure 16) is wrapped around the projecting end of the rod 243 and engages against the rear face of the arm 232 and the pawl 247 to normally bias the rod 243 against its direction of angular movement as effected by engagement between the lugs 245 and 246. The pawl 247, in its position as shown in Figure 16, is in the path of intermittent rotation of an arm 249 keyed at 250 to the tier shaft 65. The direction of rotation of the tier shaft is indicated in Figure 16.

The rod 243, in addition to being rockably carried by the bearing 242 on the measuring wheel shaft 236, is also slidable in the bearing 242. The opposite end of the rod or shaft 243 that is carried in the bearing 244 on the swingable arm 232 is provided with a collar 251 that is pinned to the rod 243 by a pin 252. The pawl 247 is likewise pinned or otherwise fixed to the right-hand end of the rod 243 so that the bearing 244 is between the pawl and the collar 251. Hence, longitudinal shifting of the rod 243 along its principal axis will cause or be effected by swinging of the arm 232, the relationship of which to the operation will be set forth below.

Action of the spring 233 tends to move the swingable arm 232 toward the left hand end of the bale case. However, engagement between the pawl 247 and the arm 249 prevents such shifting of the arm 232. At the same time, the shaft 65 is not rotating and the arm 249 is, of course, stationary. The parts are in the position shown in Figure 11, during reciprocation of the plunger and idleness of the tying mechanism.

*Lower wire-carrier and needle guide casting— Figures 21–25*

(Reference numerals 42a, 79, 79a, 253–270)

As described above, the bottom wall 42 of the bale case is provided with the opening 42$^a$ to accommodate the upwardly moving needles 79. Also, as previously described, the needle guide casting 79$^a$ is associated with the opening 42$^a$.

The needle guide casting 79$^a$ has an upper web or flange 253 which is rigidly secured to the bottom wall of the bale case. This casting has at each side thereof, and spaced apart on the order of the lateral spacing of the needles 79, depending guide portions 254. Each guide portion has formed therein an elongated slot 255 which runs lengthwise of the bale case and which opens upwardly and downwardly. Each slot is provided intermediate its ends with a pair of vertical recesses 256 which provide guides for guide rollers 257 (Figure 25) on the needles 79. When the plunger 47 is in its compression position, the needle guide tracks 52 therein are respectively in vertical alinement with the roller guides 256 in the needle guide casting 79$^a$.

The fluid motor 186 for the lower wire guide or carrier 78 is secured to the bottom wall 42 of the bale case, as by a bracket 258. This motor comprises a cylinder 259 and a piston which has a piston rod 260 extending therefrom toward the right side of the bale case. The free end of the piston rod is threaded and passes through an aperture in a transverse plate 261 and receives a nut 262 to secure the plate rigidly thereto.

The plate carries at each side of the piston rod 260 a roller-carrier structure comprising a pair of elongated members 263. Each pair of members is secured at one end to one side of the plate 261 and rides at its other end in tracks 265 formed in the needle guide casting 79$^a$ and associated with the respective slots 255 (Figure 22). Each pair of members 263 carries at its free or casting-supported end a pair of wire-carrying rollers 266, each pair receiving the respective lower wire $W^1$.

As best shown in Figures 22 and 24, the bottom wall 42 of the bale case carries a longitudinal slide 267 which cooperates with a slotted portion 268 of the plate 261 to guide the carrier structure back and forth as the motor 186 is actuated. Fluid lines 269 and 270 are shown in Figure 21 as being connected to the motor 186. These lines may be considered to branch off respectively from the lines 207 and 208 for the upper motor 185.

Figure 21 illustrates the retracted position of the carrier members 263; that is, the position in which the rollers 266 are moved out of the path of the upwardly moving needles 79. The corresponding position of the carrier as viewed from above appears in full lines in Figure 22. This figure also shows in broken lines the positions of the rollers when the motor 186 is contracted. In this position of the parts, the arrangement corresponds to that illustrated in Figure 7. Figure 21 corresponds to a phase intermediate that of Figures 8 and 9.

*General description of operation*

When the parts are in the positions shown in Figure 12 of the drawings, the baler is operating with the plunger reciprocating and the tying mechanism idle. This result is achieved because the control valve is in such position that the brake 175 is applied and the holding means 174—180 is released. Hence, the circular plate 174 rotates with the crankshaft 150. The tier clutch 132—134 is disengaged. As material is fed through the feed opening 46 in the bale case 40 and encountered and compressed by the reciprocating plunger 47, it is moved toward the left-hand or discharge end of the baler, thus rotating the measuring wheel eventually through one complete revolution, in response to which the control rod 243 is rocked to effect engagement of the bell crank lug 221 with the notch 176 in the rotating plate 174.

As the rotating plate 174 engages the bell crank lug 221, the control arm 212 is caused to swing toward the right-hand end of the bale case against the tension of the spring 216, thus moving the control valve member 200 to the position shown in Figure 13. This action of the control valve reverses the action of the control means on the epicyclic gear train, thus releasing the brake 175, and simultaneously effecting engagement of the tier clutch 132—134 and retraction of the wire guide carriers 74 and 78. The motion-transmitting connection effected by the notch 176 and bell crank lug 221 serves also as means for stopping the crankshaft 174. However, in order that the crankshaft will be stopped only when the plunger is on its compression stroke, the indexing means comprising the notch 177 and lug 180 on the lever 187 takes effect, the angular position of the notch 177 on the plate 174 being properly timed with the crank throw 154.

Completion of the tying operation is effected in one revolution of the tier shaft 65, following which the previously released arm 249 on the tier shaft reengages the pawl 247 on the trip rod 243 to ultimately release the bell crank lug 221 from the notch 176 in the plate 174. Thereupon, the spring 216 retracts the arm or control plate 212 toward the left-hand end of the bale case and again shifts the shiftable valve member 200 to the position of Figure 12, again incurring idleness of the tying mechanism and mobilizing or operation of the plunger 47.

Thus it will be seen that the automatic operation of the baler is dependent upon the satisfaction of three basic requirements, namely, the accumulation of a predetermined quantity of material in the bale case and attainment by the plunger of a position at or substantially at the end of its compression stroke, and completion of the tying operation. The first two are characteristic of two different phases in the bale-forming operation; and the third requirement is a characteristic of the bale-tying operation.

*Specific description of the operation*

The condition in which the parts occupy the positions shown in the main figures of the drawings, and particularly the relationship of the control means as illustrated in Figure 12, is a normal condition incident to starting up the baler, in which case it will be assumed that the bale case is empty. The control member or plate 212 is dependent upon actuation in the first instance by the tension spring 216, which normally maintains the plate 212 so that the upper end thereof is swung toward the left-hand end of the bale case 40. This means that the control valve member 200 is in the position shown in Figure 12.

When the baler is started, power supplied from the initial source (here through the propeller shaft 108) is transmitted through the sheaves and belts to the sheave 126 of the epicyclic driving mechanism. At the same time, the pump sheave 191 is driven to incur operation of the pump 190 to supply fluid under pressure to the motors 181 and 184 and to the right-hand end of the two-way wire guide motor 182. The motor 181 retracts the index lever 178 so that the plate 174 on the plunger crankshaft 150 is disengaged and allowed to rotate as the plunger reciprocates. Simultaneously, the motor 184 effects energizing of the brake 175 to hold the tier output drum 158 and member 128 demobilized or stationary. Also simultaneously, the motor 162 is exhausted through the left-hand end of the motor 185 so that the tier clutch is disengaged.

Material fed by the feeding means 30 passes through the inlet opening 46 in the front wall of the bale case 40 and is compressed by the plunger into a bale. As the bale moves toward the discharge end of the bale case and increases in length, the measuring wheel 235 is rotated in a counterclockwise direction as viewed in Figure 11. As the measuring wheel completes one revolution, the arm 240, by virtue of the lug 245 thereon, engages the lug 246 on the trip rod 243, thereupon rotating the pawl or dog 247 in such manner that it escapes from the latching or locking effect of the arm 249 that is keyed to the tier shaft 65 (not stationary).

When the pawl 247 is thus released from the stationary arm 249, the spring 233 rocks the arm 232 about the axis of the shaft 65 in the direction of the arrow A in Figure 16 (or toward the left-hand end of the bale case), the initial tension in the spring 233 being responsible for this effect. This action of the spring 233 and arm 232 causes the link 230 to be shifted toward the left-hand end of the bale case, thereby rocking the triangular member 224 in a clockwise direction (as viewed in Figure 11) about its pivot 225. The member 224 thus depresses the inner end of the bell crank 219 and rocks the bell crank about its pivot 220 so that the lug 221 thereon moves forwardly and into the path of the notch 176 in the rotating plate 174.

As previously described, the rotating plate thus picks up the bell crank 219 and, since the bell crank is connected to the control member 212, shifts the control member toward the right-hand end of the bale case and against the tension of the spring 216. This movement of the control member effects, as aforesaid, shifting of the control valve member 200 to the position shown in Figure 13.

As soon as the driving member 240 on the measuring wheel shaft 236 has engaged and rocked the trip rod 243, the lugs 245 and 246 separate. The trip rod 243 then rotates in the reverse direction under action of the torsion spring 248, thus restoring the pawl or dog 247 to the position shown in Figure 16. In the meantime, shifting of the control valve member 200 to the position of Figure 13 has reversed the mobilizing and demobilizing of the output members in the epicyclic gear train so that the tying mechanism has been started and the arm 249 on the tier shaft 65 has now moved past the restored pawl 247.

*Description of the tying operation*

Initiation of the tying operation is, as aforesaid, effected by demobilizing of the plunger crankshaft because of engagement between the plate 174 and control member 212. As the member 224 rocks through the angular range sufficient to shift the control member, the notch 177 in the plate becomes alined with the lug 180 on the index lever 178. Before that, the control member has shifted the valve so that the motor 181 is exhausted, whereupon the spring 183 behind the index lever 178 is conditioned to move the index lever in such manner as to effect engagement between the lug 180 and the notch 177. The plunger is thereupon held at the end of its compression stroke. The index means further provides locking means for preventing retrograde movement of the plunger and thus eliminates any possibility that the control member 212 could inadvertently shift back toward the left-hand end of the bale case and disrupt the tying operation.

Upon reversal of the application of fluid pressure, fluid is exhausted from the left-hand end (as viewed in Fig. 12) of the wire guide carrier motors 185 and 186 and is applied to the right-hand ends of the motors and simultaneously through the conduit 209 to the tier clutch motor 142. Substantially simultaneously with mobilizing of the tier output sheave 128, the tier clutch 132—134 is engaged, whereupon the tying mechanism is actuated as described above.

When the upper portion of the tying mechanism, namely, the tying mechanism housing 54, is in its upper position, it is remote from the bale case and is free from the upper wires W. In this position, the housing 54 is out of the path of flying dust and fragments of hay or straw that are incident to the usual baling operation. Further, freedom of the twister and kinker gears from the upper wires W means that these wires can lie more closely proximate to the bale, hence eliminating undesirable slack in the wires. The same results in general occur at the lower portion of the bale case. That is, the lower wires W¹ are held by the rollers 206 in close proximity to the bottom of the bale and these wires are free from or not engaged by the rollers 94 of the needles 79.

The simultaneous retraction of the carriers 75 and 78 and the simultaneous movement of the tying components 54 and 79 to cooperative tying positions have been described above and need not be repeated.

The relationship of the lower wires W¹ to the needles 79 should be noted in one particular respect. That is, the wires W¹ extend along the bottom of the bale and thence upwardly to the point where they are united with the upper wires W at knot K. As the needles 79 move upwardly to bring the wires W¹ into proximity to the downwardly moving tying mechanism housing 54, the wires W¹ are tightened about the bale and the necessary length thereof is payed out from the lower wire coils C¹. It sometimes happens in balers and other machinery equipped with tying mechanism, that the tying operation fails for some reason or another. If such failure should occur in the present case, it would not be necessary to re-thread the needles 79, since the wires W¹ are engaged only by the upwardly moving needles and are not in any way wrapped around the rollers 94. In prior constructions, in which the wires or twine is threaded through the needles, the machine must be stopped while the needles are re-threaded every time a miss occurs in the tying mechanism.

As the tier shaft completes one revolution to effect the tying operation, the arm 249 keyed at 250 to the forward end of the shaft 65 again approaches the pawl 247. The spring 233 is now holding the arm 232 in a position more toward the left-hand end of the bale case than the position shown in Figure 11. The pawl 247 is fixed to the trip rod 243 at one side of the bearing 244, and since the collar 251 is pinned at 252 to the rod 243 at the other side of the bearing 244, the pawl 247 likewise is in a position toward the left-hand end of the bale case. Now, the angularly moving arm 249, approaching the end of its travel through 360°, engages the pawl 247 and shifts the pawl and consequently the arm 232 toward the right-hand end of the bale case against the tension of the spring 233. This action effects shifting of the link 230 toward the right-hand end of the bale case and the link effects rocking of the triangular member 224 in a counterclockwise direction (as viewed in Figure 11) about its mounting pivot 255. This rocking of the member 224 elevates the inner upper end of the bell crank 219 and swings the bell crank lug 221 out of engagement with the notch 176 in the now stationary plate 174. Since the control member 212 is loaded by the spring 216, the obvious result is that the control member swings toward the left-hand end of the bale case. This action of the control member re-shifts the control valve member 200 from the position of Figure 13 to the position of Figure 12 and again reverses the effect of the fluid-pressure system. That is, the motors 181 and 184 are again subjected to pressure, with the result that the index lever 178 is moved again to the position of Figure 11 and the brake 175 is again energized to demobilize the tier output member or element 128—158. Simultaneously, the tier clutch motor 142 is exhausted through the conduit 209, the left-hand end of the motor 185 and conduit 207, along with re-shifting of the wire guide carriers 74 and 78 to the positions they occupy while the bale is being formed.

The operative cycles described above will continue as long as the baler is receiving material to be baled and tied. Obviously, if the pick-up takes in no more material to be fed to the baling chamber, the tying mechanism will cease to operate after the last bale has been tied and the plunger will continue to reciprocate until the application of power to the propeller shaft 108 is discontinued.

*Summary*

The preferred embodiment of the invention illustrated in the drawings and described above is admirably adapted to accomplish the several objects hereinbefore set forth and other objects mentioned as an incident to the description of the structure and operation of the baler. Other objects not specifically enumerated or otherwise set forth will undoubtedly occur to those versed in the art, as likewise will various modifications and alterations in the preferred structure illustrated, all of which may be achieved without departing from the spirit and scope of the invention as defined in the appended claims.

What is claimed is:

1. In a baler; means forming an elongated bale chamber having first and second walls spaced apart across the chamber, each of the walls having an opening therein and said openings being alined crosswise of the chamber; bale-forming means including a member movable lengthwise of the chamber to compress material therein, said member having a track therein crosswise thereof so as to become at times alined with the aforesaid openings; drive means for the bale-forming means demobilizable to halt the bale-forming means with the track and openings in alinement; means supported outside the first wall including a guideway alined with the first wall opening; strand-passing means movable crosswise of the chamber from the first wall to the second wall and return, and having a track follower initially received by the guideway and adapted to be supportingly received by the track in the bale-forming member to run in said track to the second wall opening; means mounting the strand-passing means for movement as aforesaid; strand-uniting means at the second wall opening, including a pocket alined with the second wall opening and adapted to receive the track follower of the strand-passing means; and means for imparting movement of the strand-passing means, from its initial position in the guideway at the first wall opening, into and through the track of the halted bale-forming member and thence into the pocket of the strand-uniting means.

2. The invention defined in claim 1, further characterized in that: the track in the bale-forming member lies in a straight-line path across the member; the pocket in the strand-uniting means communicates with the second wall opening and angles outwardly and lengthwise of the chamber so that the track follower of the strand-passing means, as it leaves the track to enter the pocket, shifts lengthwise and outwardly; and the means for mounting the strand-passing means includes an articulate mounting providing for such shifting of the strand-passing means into the pocket of the strand-uniting means.

3. The invention defined in claim 1, further characterized in that: the guideway means at the first wall opening includes a support in which the guideway is formed; said support has an elongated bearing outside and lengthwise of the chamber; strand-supporting means is carried by the bearing for movement between a normal position alined with the first wall opening and a retracted position out of such alinement; and actuating means is provided for moving the strand-supporting means to its retracted position to provide a clear path for movement of the track follower of the strand-passing means from the guideway into the track of the halted bale-forming member.

4. The invention defined in claim 1, further characterized in that: the track follower comprises a pair of spaced-apart, track-engaging rollers and a strand-engaging roller intermediate said track-engaging rollers.

5. The invention defined in claim 1, further characterized in that: the walls include a second pair of openings in alinement on a line parallel to that of the first-mentioned openings; the bale-forming member has a second track parallel to the first-mentioned track and alinable with said second pair of openings; the strand-uniting means includes a second pocket related to the second openings and the second track in the same manner as the first-mentioned pocket is related to the first-mentioned openings and track; the means including the guideway comprises a rigid unitary support secured across the outside of the first wall and having a second guideway paralleling the first-mentioned guideway and related to the second-mentioned openings and track in the same manner that the first-mentioned guideway is related to the first-mentioned openings and track; and the strand-passing means includes a second track follower movable from the second guideway and through the second track into the second pocket simultaneously with movement of the first track follower from the first guideway and through the first track into the first pocket.

6. In a baler: supporting structure having means providing a bale chamber having an apertured wall portion through which a bale-tying medium may extend; bale-forming means movable in the chamber; mobilizable and demobilizable drive means for the bale-forming means; a self-contained tying unit outside the chamber, including a housing having tying mechanism therein and carried entirely thereby; means mounting the tying unit on the supporting structure for shifting selectively between a first position, in which said unit is spaced outwardly from the apertured wall portion of the chamber and completely free from the tying medium, to a second posiiton adjacent said apertured wall portion to receive the tying medium; mobilizable and demobilizable drive means for the tying mechanism effective to demobilize said mechanism in its first position and to mobilize it in its second position; mobilizable and demobilizable means for alternately incurring the first and second positions of the tying unit; and means coordinating all of said mobilizable and demobilizable means for incurring alternately the mobilizing of the bale-forming means, the demobilizing of the tying mechanism and the first position of the tying unit, or demobilizing of the bale-forming means, the second position of the tying unit and the mobilizing of the tying mechanism.

7. In a baler: supporting structure having means providing a bale chamber having an apertured wall portion through which a bale-tying medium may extend; bale-forming means movable in the chamber; a self-contained tying unit outside the chamber, including a housing having tying mechanism therein and carried entirely thereby; means mounting the tying unit on the supporting structure for shifting selectively between a first position, in which said unit is spaced outwardly from the apertured wall portion of the chamber and completely free from the tying medium, to a second position adjacent said apertured wall portion to receive the tying medium; mobilizable and demobilizable drive means for the tying mechanism effective to demobilize said mechanism in its first position and to mobilize it in its second position; mobilizable and demobilizable means for alternately incurring the first and second positions of the tying unit; and means coordinating both of said mobilizable and demobilizable means for incurring alternately the demobilizing of the tying mechanism and the first position of the tying unit, or the second position of the tying unit and the mobilizing of the tying mechanism.

8. In a baler having supporting structure including an elongated baling chamber having a wall in which is provided an opening through which access may be had from outside the wall to a bale-tying strand inside the wall, the improvement comprising: a support carried by the supporting structure outside the wall and spaced from the opening; an arm pivoted at one end on the support for swinging of its other end selectively toward or away from the opening; bale-tying means supported by the arm and including drivable-tying mechanism for engagement via the opening with the bale-tying strand when the arm swings toward the opening and for disengagement from said strand when the arm swings away from the opening; drive mechanism for effecting movement of the arm first toward and then away from the opening, said drive mechanism including delay-producing means for effecting a dwell of the tying means at the opening; and means operatively connected between the drive mechanism and the tying mechanism for operating the tying mechanism during the dwell and for discontinuing operation of said tying mechanism incident to movement of the tying means away from the opening.

9. The invention defined in claim 8, further characterized in that the drive mechanism comprises a rotary shaft having fixed thereto a cam and a gear segment, and the means operatively connecting the drive and tying mechanisms includes a pinion meshable at times with the gear segment for driving the tying mechanism; and said gear segment and cam are so angularly related and timed and said cam having high and low portions such that the high portion influences the arm away from the opening while the gear segment is out of mesh with the pinion and the low portion provides the aforesaid dwell while the gear segment meshes with the pinion.

MARCUS E. McCLELLAN.
LEO G. CHEATUM.
GEORGE B. HILL.

REFERENCES CITED

The following references are of record in the file of this patent:

UNITED STATES PATENTS

| Number | Name | Date |
|---|---|---|
| 994,662 | Schubert | June 6, 1911 |
| 1,015,327 | Koontz | Jan. 23, 1912 |
| 1,232,643 | Wygant | July 10, 1917 |
| 1,309,168 | Wygant | July 8, 1919 |
| 1,579,777 | Pearson et al. | Apr. 6, 1926 |
| 2,236,628 | Nolt | Apr. 1, 1941 |
| 2,396,720 | Nolt | Mar. 19, 1946 |
| 2,400,555 | Johnston | May 21, 1946 |